Aug. 10, 1943.   J. BLECHA   2,326,197
HYDRAULIC REVERSE SCRAPER
Filed Aug. 27, 1942   3 Sheets-Sheet 1
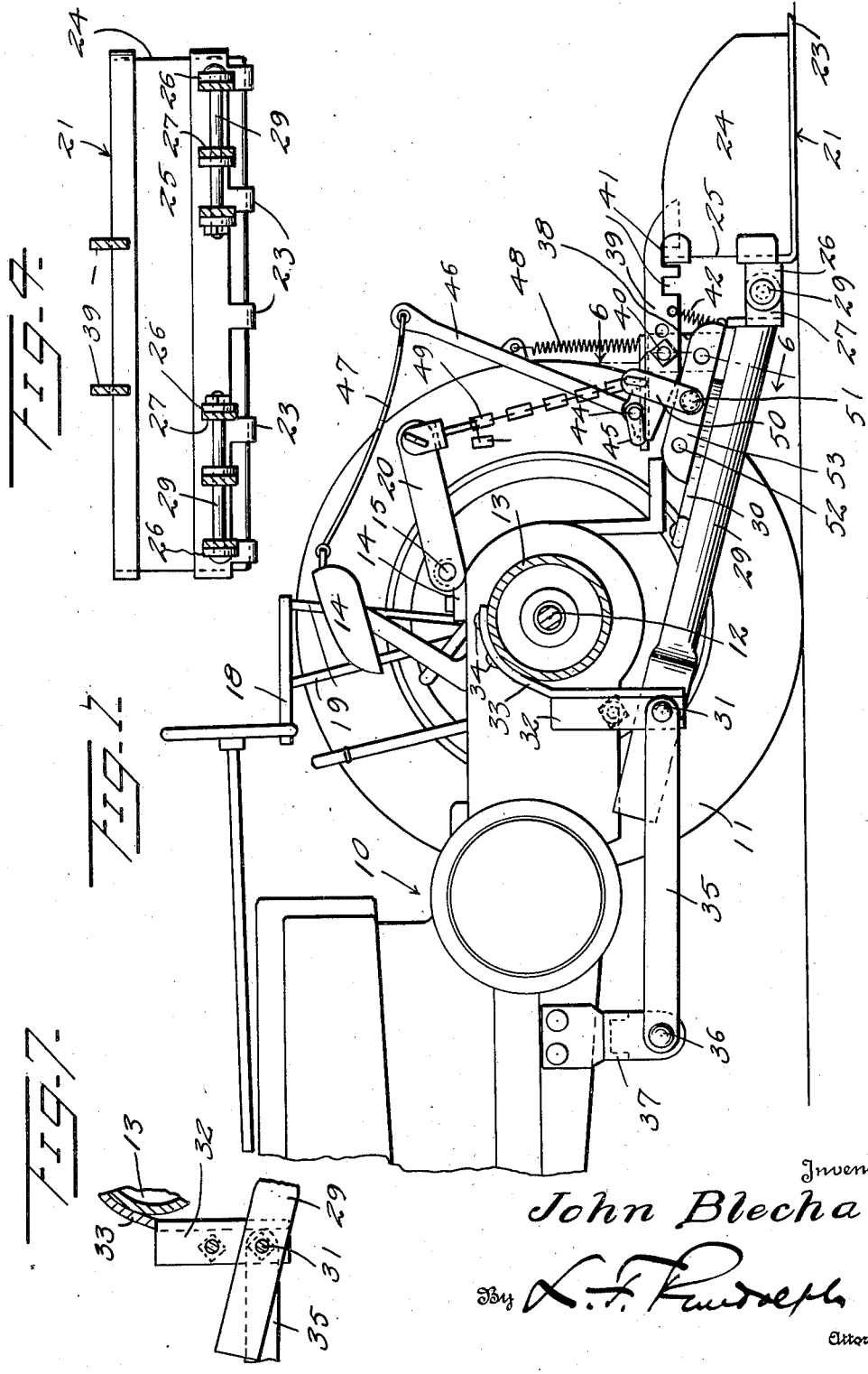
Inventor
John Blecha
By L. F. Rudolph
Attorney

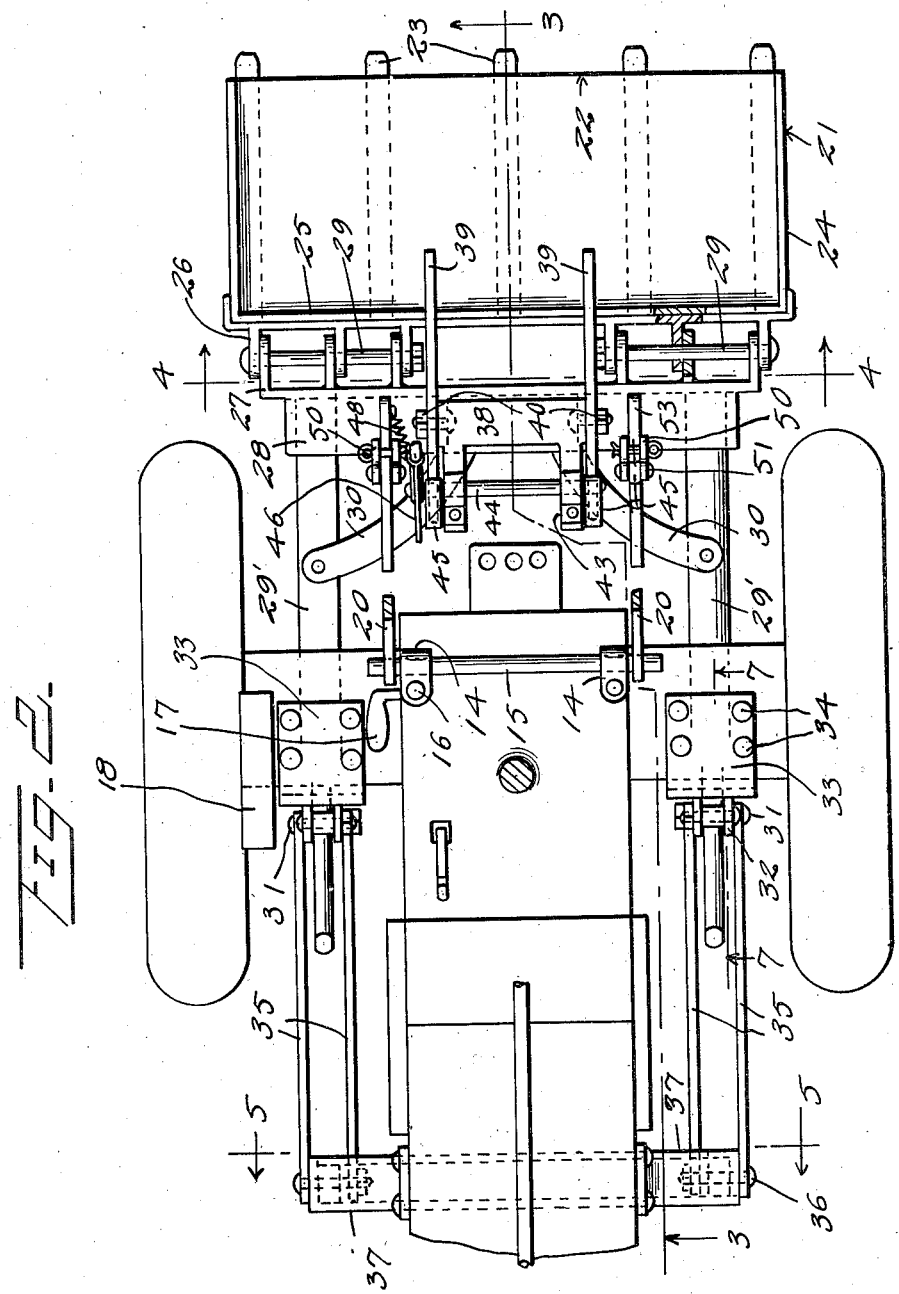

Aug. 10, 1943.                J. BLECHA                2,326,197
                        HYDRAULIC REVERSE SCRAPER
                         Filed Aug. 27, 1942          3 Sheets-Sheet 3
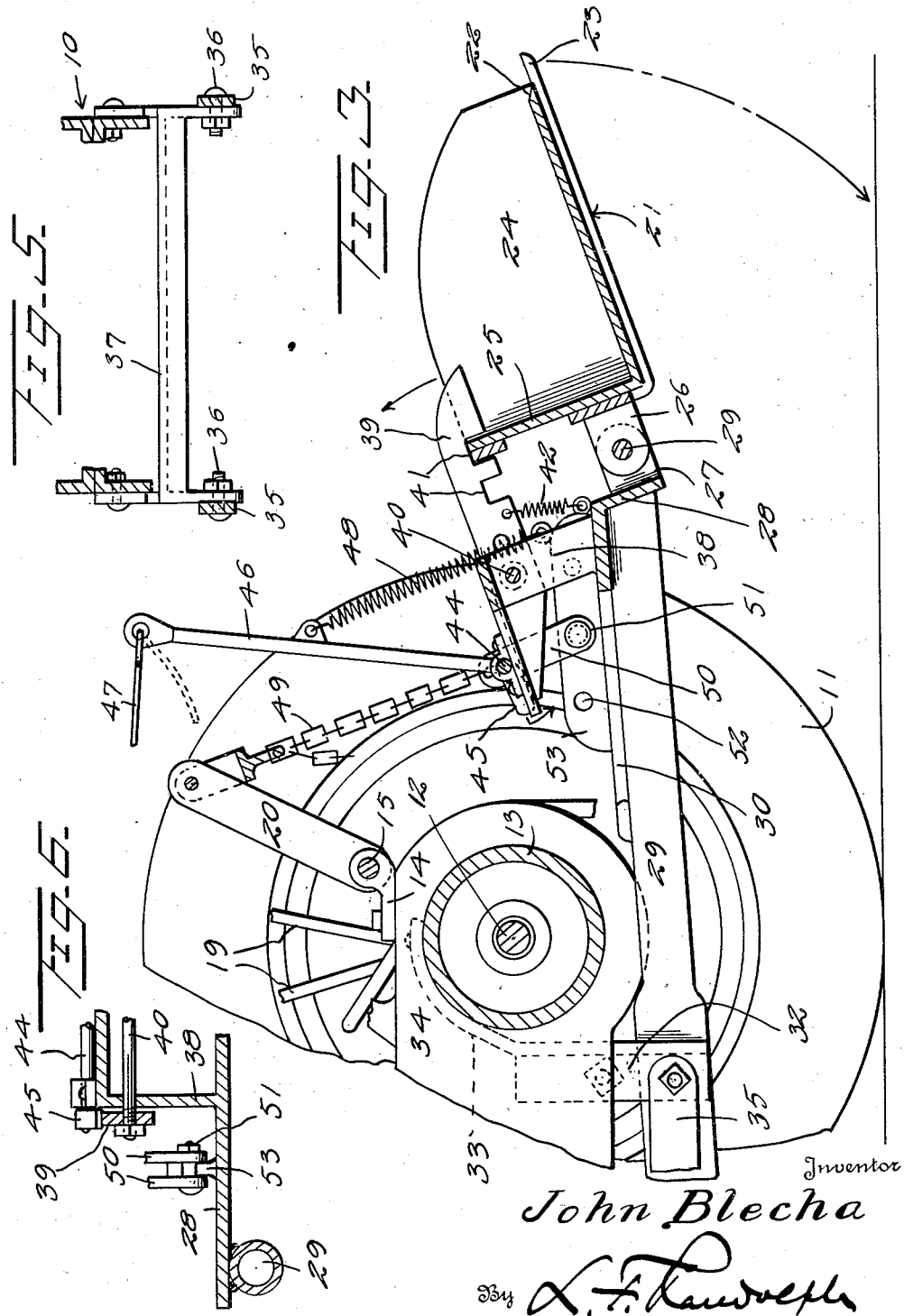
Inventor
John Blecha Patented Aug. 10, 1943

2,326,197

UNITED STATES PATENT OFFICE 2,326,197

HYDRAULIC REVERSE SCRAPER

John Blecha, Kremmling, Colo.

Application August 27, 1942, Serial No. 456,384

4 Claims. (Cl. 37—124)

This invention relates to a scraper means for attachment to a tractor behind the rear wheel thereof to function when the tractor is reversed or moved in a backward direction.

It is particularly aimed to provide a scraping mechanism of the character described which will avoid the necessity of driving the tractor over rough terrain but on the contrary will enable the tractor to operate the scraping mechanism into the load, the tractor having smooth footing, and further to provide a structure wherein the necessity of turning the tractor around on narrow ditch banks which is often impossible is avoided. The tractor according to the present invention is reversed and driven onto the ditch banks and then driven forward to get back into the ditch.

The more specific objects and advantages will become apparent from a consideration of the description following taken in connection with the accompanying drawings illustrating an operative embodiment.

In said drawings:

Figure 1 is a view primarily in elevation, of a tractor shown fragmentarily and partly in section, with my improvement in side elevation applied thereto;

Figure 2 is a plan view of the parts of Figure 1;

Figure 3 is an enlarged view primarily in vertical section, showing my improvement in connection with a portion of a tractor;

Figure 4 is a cross section taken on the line 4—4 of Figure 2;

Figure 5 is a cross section taken on the line 5—5 of Figure 2;

Figure 6 is a cross section taken on the line 6—6 of Figure 1 and

Figure 7 is a cross section taken on the line 7—7 of Figure 2.

Referring specifically to the drawings wherein like reference characters designate like or similar parts, my improvements form an attachment for a tractor or are initially built into a tractor, as preferred. A conventional tractor is shown at 10. The rear wheels 11 thereof are driven by an axle enclosed within a housing 13. The usual operator's seat is located at 14 adjacent to the controls of the tractor.

Journaled in bearings 14 on the top of the differential housing or other part of the tractor is a horizontal rock shaft 15. Such shaft 15 is rocked or turned by suitable mechanism, preferably hydraulic, specifically forming no part of the invention and which is controlled by operation of an element 17, accessible to an occupant of seat 18 which latter is disposed adjacent to one of the wheels 11 and is supported from the frame of the tractor or other part by the element 19.

At opposite ends of the rockshaft 15, similar cranks 20 are rigidly fastened so that through the rocking of shaft 15, the cranks 20 will be raised or lowered correspondingly to raise or lower, through intermediate mechanism, a scraper 21. Scraper 21 may be of any desired form and it is located transversely of the machine with its rear edge 22 constituting a cutting or scraping edge, whose action may be augmented by teeth or projections 23. Such scraper 21 preferably has end walls 24 and a back wall 25, joining them.

Scraper 21 is adjustable transversely of the machine, from the central position shown to a position closer to either side of the tractor. To this end, equidistantly spaced lugs 26 project rearwardly from the back wall 25 and over-lap lugs 27 carried by a mounting or supporting bar 28. Removable bolts 29 pass through the lugs 26 and 27 and pivotally mount the scraper 21 thereon. Various one of the said lugs 27 and 26 may be brought into engagement accompanied by removal and replacement of the bolts 29, in order to arrange the scraper at any permissible lateral adjustment.

Said mounting bar 28 is welded or otherwise rigidly connected to lifting arms 29', one on each side of the machine. Braces 30, extend from the supporting bar 28 to the lifting arms 29' and are welded or riveted thereto as preferred.

Said lifting arms 29' adjacent their forward ends, are pivoted by bolts 31 to depending portions 32 of brackets 33, riveted or otherwise fastened at 34 to the rear axle housing 13. The portions 32, are rigidified by pairs of links 35 fastened at their rear ends by the bolts 31 and at the other ends by bolts 36 to brackets 37, rigidly attached to the chassis of the tractor. An arched bracket or mounting 38 rises centrally from the bar 28, and latches 39 are pivoted by bolts 40 to the sides of the bracket 38 and in their lower edges have any desired number of notches 41, which selectively receive the upper edge of the back 25 of the scraper, according to the angle or depth of cut desired. Latches 39 are held engaged with such back wall 25 by means of a contractile spring 42 fastened thereto and to the bar 28.

Bracket 38 has spaced extensions at 43 in which a cross rod 44 is journaled and which has lugs 45 thereon normally resting on the upper edges of the latches 39 at the rear thereof. Rod 44 is formed rigid with a lever 46, which is operable by a cable or the like 47, in order to swing the lever and cause the lugs 45 to depress the rear ends of the latches to raise them out of engagement with wall 25, which is desirable, especially in emptying the scraper in a raised position. Lever 46 is maintained in normal position by a contractile spring 48, fastened thereto and to bracket 38.

Chains 49 are suspended from the cranks 20, and they are loosely connected at their lower ends to links 50 pivotally attached by bolts 51, in any of a series of openings 52, provided in webs 53, rising from the bar 28. The series of openings 52, enable adjustable connection of the chain 49.

The structure is operated by the occupant seated at 18, and thus in a position for engagement of one foot with the control element 17 to cause rocking of the shaft 15, thus raising and lowering the scraper 21 according to the direction of rocking, from the position of Figure 1 to that of Figure 3. In the latter position, cable 47 may be operated in order to disengage the latches 39 from the scraper, permitting the same to swing downwardly on the axis of bolts 29 in order to empty. Thereafter, when the lifting arms 29' and bar 28 and associated parts are lowered, the scraper will automatically reengage the latches through travel over the ground.

One great advantage of the present invention is that the scraper does not have to be driven over rough ground which often-times is practically impossible to traverse. The tractor reverses or backs into the load irrespective of the roughness of the ground or relatively smooth footing. In cleaning irrigation ditches, I find that I do not have to turn the tractor around on narrow ditch banks, which often-times is almost impossible. The tractor is operated in reverse onto the ditch banks and then driven forward in order to get back into the ditch.

Various changes may be resorted to provided they fall within the spirit and scope of the invention.

I claim as my invention:

1. A structure of the class described comprising lifting bars adapted to be pivoted to a tractor, a mounting bar connecting the lifting bars, a scraper, pivotal connections between the scraper and the mounting bar providing means for mounting the scraper on the mounting bar in various selected positions laterally and latch means between the mounting bar and scraper.

2. A structure of the class described comprising lifting bars adapted to be pivoted to a tractor, a mounting bar connecting the lifting bars, a scraper, pivotal connections between the scraper and the mounting bar providing means for mounting the scraper on the mounting bar in various selected positions laterally, a bracket rising from said mounting bar, latch means pivoted to the bracket and engaged with the scraper, and means mounted on the bracket operable to disengage the latch means from the scraper.

3. A structure of the class described comprising lifting bars adapted to be pivoted to a tractor, a mounting bar connecting the lifting bars, a scraper, pivotal connections between the scraper and the mounting bar providing means for mounting the scraper on the mounting bar in various selected positions laterally, a bracket rising from said mounting bar, latch means pivoted to the bracket and engaged with the scraper, means mounted on the bracket operable to disengage the latch means from the scraper, said means consisting of a shaft, and lug means on the shaft engageable against the latch means.

4. A structure of the class described comprising lifting bars adapted to be pivoted to a tractor, a mounting bar connecting the lifting bars, a scraper, pivotal connections between the scraper and the mounting bar providing means for mounting the scraper upon the mounting bar in various selected positions laterally, a rockshaft, cranks extending from the rockshaft, flexible suspending means between the cranks and mounting bar, a latch member between the mounting bar and scraper, notches engageable with the scraper, a bracket rising from the mounting bar to which the latch member is pivoted, a shaft journaled on the bracket, and a lug carried by the shaft operable against the latch member to disengage the latter from the scraper.

JOHN BLECHA.